(12) United States Patent
Wong et al.

(10) Patent No.: US 9,880,390 B2
(45) Date of Patent: Jan. 30, 2018

(54) SYSTEM, METHOD AND APPARATUS FOR IMPROVING THE SPECTRAL RESOLUTION AND SIGNAL-TO-NOISE RATIO OF OPTICAL SPECTROMETER USING DIGITAL BEAM REFOCUSING, REFORMING, SLICING, AND MULTIPLEXING

(71) Applicants: Alexander Sheung Lai Wong, Waterloo (CA); Farnoud Kazemzadeh, Waterloo (CA)

(72) Inventors: Alexander Sheung Lai Wong, Waterloo (CA); Farnoud Kazemzadeh, Waterloo (CA)

( * ) Notice: Subject to any disclaimer, the term of this patent is extended or adjusted under 35 U.S.C. 154(b) by 0 days.

(21) Appl. No.: 15/219,933

(22) Filed: Jul. 26, 2016

(65) Prior Publication Data

US 2017/0031166 A1  Feb. 2, 2017

Related U.S. Application Data

(60) Provisional application No. 62/199,732, filed on Jul. 31, 2015.

(51) Int. Cl.
  *G02B 27/10*  (2006.01)
  *G01J 3/02*  (2006.01)

(52) U.S. Cl.
  CPC .............. *G02B 27/10* (2013.01); *G01J 3/027* (2013.01)

(58) Field of Classification Search
  USPC ................................................ 359/618–622
  See application file for complete search history.

(56) References Cited

U.S. PATENT DOCUMENTS

| | | | | |
|---|---|---|---|---|
| 5,155,628 A | * | 10/1992 | Dosmann | G01N 21/255 359/618 |
| 6,188,507 B1 | * | 2/2001 | Thomas | G02F 1/33 348/754 |
| 7,961,397 B2 | * | 6/2011 | Marchman | H01J 37/226 250/492.1 |

* cited by examiner

*Primary Examiner* — Mohammed Hasan
(74) *Attorney, Agent, or Firm* — Tai W Nahm; Miller Thomson LLP

(57) ABSTRACT

There is disclosed a novel system and method for improving spectral resolution and signal-to-noise ratio of a captured spectrum by employing digital beam reforming, digital slicing, and digital multiplexing. In an embodiment, the method comprises: and entrance aperture for the light to enter the apparatus, a collimating element (refractive or reflective), a dispersive element (single- or multi-axis), a focusing element (refractive or reflective), and a linear or array detector for acquisition of the spectrum. The spectrum is then digitally beam reformed, digitally beam sliced to increase spectral resolution, and digitally beam multiplexed to increase the signal-to-noise ratio. In addition the disclosed invention is also capable of performing digital beam refocusing which means the optical focusing power can be chosen such that its performance surpasses the performance of any analog optical focusing element thereby further increasing the spectral resolution and the signal-to-noise ratio of the spectrum. The invention can be used as a stand-alone system or can be used in conjunction of any spectrometer even those augmented with optical slicer technologies. The degree of improvement to the spectral resolution is completely tunable and has no bearing of the efficiency of the instrument.

22 Claims, 7 Drawing Sheets

SYSTEM, METHOD AND APPARATUS FOR IMPROVING THE SPECTRAL RESOLUTION AND SIGNAL-TO-NOISE RATIO OF OPTICAL SPECTROMETER USING DIGITAL BEAM REFOCUSING, REFORMING, SLICING, AND MULTIPLEXING

FIELD OF THE INVENTION

The present disclosure relates generally to the field of spectroscopy and more specifically to systems, methods, and apparatus for improving spectral resolution and signal-to-noise ratio of the captured spectrum.

BACKGROUND

In a typical optical spectrometer, light is taken in and focused onto an entrance aperture, typically a slit, and a portion of the light passes through this aperture. The light beam passing through the entrance aperture then encounters a collimating element to produce a collimated beam of light rays that are parallel to each other. The collimated light beam is then projected onto a dispersive element such as a diffraction grating or a prism which split the input light beam into its spectral components in the form of multiple collimated, parallel, light beams traveling at different angles depending on the wavelength of light prescribed by the grating equation. The multiple output light beams from the dispersive element encounter a focusing element and are then focused onto either a linear or an array detector, such as a charged-coupled device (CCD) detector or a complementary metal oxide semiconductor (CMOS) detector or Indium Gallium Arsenide (InGaAs), where the light beams are recorded as a spectrum.

The spectral resolution and signal-to-noise ratio (SNR) of a typical optical spectrometer, which affects the ability to distinguish closely spaced spectral features such as transmission lines, absorption lines, and emission lines, is controlled by a number of different factors such as the size and shape of the entrance aperture, the optical characteristics of the dispersive element, the optical characteristics of the collimating optics and the focusing optics, and the size and shape of the detector's pixels. In particular, the size of the entrance aperture (e.g., width of slit used as entrance aperture) and the optical power of the focusing element are the primary factor affecting the tradeoff between spectral resolution and SNR. A focusing element that can create a very sharp focused spot can be useful in increasing the spectral resolution of a spectrograph but, there exists fundamental limitations in manufacturing and designing of focusing elements with high optical powers (small focal ratio f/# or large numerical aperture) therefore more efforts have been put forth in decreasing the size of the entrance aperture in order to increase the spectral resolution. The spectral resolution of the spectrometer can be increased by decreasing the size, specifically its width along the spectral axis, of the entrance aperture, as a smaller portion of the light taken in by the spectrometer passes through the entrance aperture and therefore subtends a smaller portion of the detector array to allow closely spaced spectral features to be distinguished. However, this decrease in size of the entrance aperture also decreases the light throughput of the spectrometer as less light is allowed to enter the spectrometer, and therefore leads to a decrease in SNR. In applications such as Raman spectroscopy, biomedical spectroscopy, and astronomy among many other applications, where the amount of light available to the spectrometer is low and signal quality is paramount, a system, method, and/or apparatus that allows for an increase in both spectral resolution and SNR is highly desired.

Previous methods of improving both the spectral resolution and SNR has focused primarily on the design of analog optical slicers situated before the dispersive element of the spectrometer. Some optical slicers use specialized prisms to slice a light beam [1], where the performance depends on the optical properties of the prism which is wavelength dependent and can limit its use in broadband light conditions. Some optical slicers -often referred to as integral field slicers- make use of slicer mirror arrays, lenslet arrays, or fiber optical bundles, in the image space, to redirect portions of the light to their respective spectrometer, thus slicing the light beam into portions with at least one of the spatial dimensions smaller than the received light beam. However, such optical slicers can be large in size and limited in getting high spectral information from all the different beam portions [2, 3, and 4]. In [5], a pupil-based optical slicer is introduced, comprising of a beam reformatter and at least one of a beam compressor and a beam expander, to improve spectral resolution while allowing for high throughput via a large entrance aperture by negating the use of a slit. The beam reformatter receives a full aperture of collimated light beam and splits it into two or more beam portions where at least one of the spatial dimensions is smaller than the received original light beam, and propagates the beam portions in the same direction to form a reformed composite beam containing the same spectral information as the received beam but with one of the spatial dimensions smaller than the received light beam. A beam expander, if used, receives the reformed beam from the beam reformed and produces an expanded beam. Abeam compressor, if used, receives the light beam first and produces a compressed light beam that passed into the beam reformed. While such optical slicing methods do improve both spectral resolution and SNR, they come at the expense of the introduction of additional analog optical elements that increase not only the complexity of the spectrometer, but also increases the cost of the spectrometer as well. These optical components (e.g., lenses, reflective surfaces, etc.) along with the associated mounting apparatus will introduce aberrations and other performance issues (i.e. alignment) to the device. Therefore, a system, method, and/or apparatus that allows for an increase in both spectral resolution and SNR without the introduction of additional analog optical components and associated mounting apparatus, such as that in an optical slicer, to the spectrometer is highly desired. Furthermore, a system, method, and/or apparatus that can further increase the spectral resolution and SNR of the spectrometer in conjunction with an optical slicer is also highly desired.

SUMMARY

The present disclosure relates generally to the field of spectroscopy and more specifically to systems, methods, and apparatus for improving spectral resolution and SNR of the captured spectrum.

Generally, the system, method, and apparatus described herein illustrates a digital beam reforming, digital beam slicing, and digital beam multiplexing unit (as well as an additional digital beam refocusing unit in some embodiments) that is incorporated into an optical spectrometer for improving spectral resolution and signal-to-noise ratio (SNR) of the optical spectrometer.

In an embodiment, the digital beam reforming, digital beam slicing, and digital beam multiplexing unit, as well as the digital beam refocusing unit may take on the form of a digital hardware unit or a number of different digital hardware units or one or more digital signal processor units;. Other embodiments as detailed below may also be used to form the digital beam reforming, slicing, and multiplexing unit, as well as a digital beam refocusing unit.

Thus, the digital beam reforming, digital beam slicing, and digital beam multiplexing unit can significantly increase both spectral resolution and SNR of the optical spectrometer without the need for additional analog optical elements, and therefore does not increase optical setup complexity or costs, or associated issues. In an embodiment, the digital beam reforming, digital beam slicing, and digital beam multiplexing unit can be used in conjunction with an optical slicer to further increase spectral resolution and SNR beyond that provided by the optical slicer alone, as shown in one of the embodiments described below.

In another embodiment, a digital beam refocusing unit, operating at any focusing optical power, is used to negate the need for an optical focusing element. The digital beam refocusing unit is designed to receive a spectrally dispersed beam and refocus the beam to digitally create a plurality of beams with the desired focus.

As discussed in further detail below, various embodiments of an improved optical spectrometer incorporating a digital beam reforming, slicing, and multiplexing ("DBRSM") unit (and a digital beam refocusing unit in some embodiments) are illustrated. With the DBRSM unit, as well as a digital beam refocusing unit in some embodiments, the present system, method, and apparatus is able to measure and distinguish closely spaced spectral features such as transmission lines, absorption lines, and emission lines better than an optical spectrometer without the DBRSM unit, thereby allowing for a higher performance optical spectrometer with significantly increased spectral resolution and SNR. Furthermore, unlike many of the analog methods for increasing spectral resolution and SNR, the present invention does not decrease the light throughput of the optical spectrometer, thereby surmounting the conventional resolution-throughput trade-off.

Thus, in an aspect, there is provided a system for improving spectral resolution and signal-to-noise ratio of an optical spectrometer, comprising: a digital beam reformer adapted to receive a spectrally dispersed beam and reform the beam spatially to create a digital beam having a plurality of digital beam portions with at least one spatial dimension smaller than the received beam; a digital beam slicer adapted to split the reformed beam and digitally split and align the plurality of digital beam portions such that their spectral information is aligned with one another; and a digital beam multiplexer adapted to combine the plurality of digital beam portions to form a final spectrum at higher spectral resolution and increased signal-to-noise ratio.

In an embodiment, the digital beam reformer is further adapted to reform the beam spatially by altering the shape and size of the received spectrally dispersed beam to produce digitally reformed spectral light beams with a desired narrow beam configuration based on calibration beam profiles, either previously determined or learned dynamically.

In another aspect, there is provided a method of improving spectral resolution and signal-to-noise ratio of an optical spectrometer, comprising: receiving a spectrally dispersed beam utilizing a digital beam reformer, and reforming the beam spatially to create a digital beam having a plurality of digital beam portions with at least one spatial dimension smaller than the received beam; splitting the reformed beam utilizing a digital beam slicer to digitally split and align the plurality of digital beam portions such that their spectral information is aligned with one another; and combining the plurality of digital beam portions utilizing a digital beam multiplexer to form a final spectrum at higher spectral resolution and increased signal-to-noise ratio.

In an embodiment, the method further comprises receiving the spectrally dispersed beam and refocussing the beam utilizing a digital beam refocuser to digital create a plurality of digital beam portions with a desired focus utilizing any focusing optical power, thereby negating the need for an optical focusing element.

In this respect, before explaining at least one embodiment of the invention in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the teachings of the disclosure as a whole. Therefore, the present system, method and apparatus is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present system, method and apparatus will be better understood and objects of the invention will become apparent when consideration is given to the following detailed description thereof. Such description makes reference to the annexed drawings, wherein.

DETAILED DESCRIPTION

Figure 1:
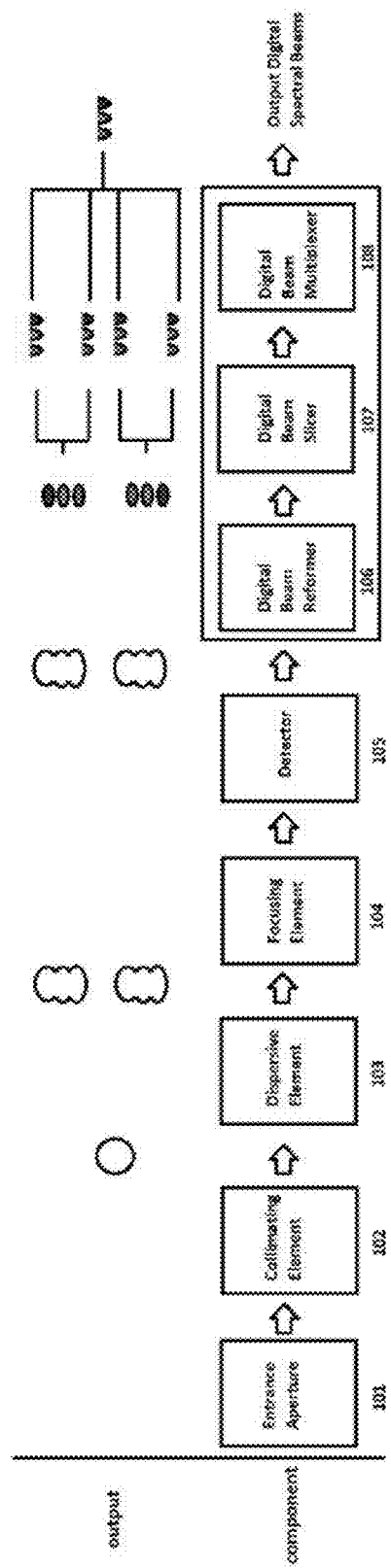
FIG. 1 shows an illustrative embodiment with a single-axis dispersive element, digital beam reformer, digital beam slicer, and digital beam multiplexer.

As noted above, the present invention relates to a system, method, and apparatus for improving the spectral resolution and signal-to-noise ratio (SNR) of optical spectrometers utilizing digital beam reforming, slicing, and multiplexing, termed herein as DBRSM. The DBRSM unit may take on the form of a digital hardware unit or a number of different digital hardware units or one or more digital signal processor units; other embodiments may also be used to form the digital beam reforming, slicing, and multiplexing unit.

Generally, the system, method, and apparatus described herein illustrates a digital beam reforming, digital beam slicing, and digital beam multiplexing unit (as well as an additional digital beam refocusing unit in some embodiments) that is incorporated into an optical spectrometer for improving spectral resolution and signal-to-noise ratio (SNR) of the optical spectrometer.

In an embodiment, the digital beam reforming, digital beam slicing, and digital beam multiplexing unit, as well as the digital beam refocusing unit may take on the form of a digital hardware unit or a number of different digital hardware units or one or more digital signal processor units;. Other embodiments as detailed below may also be used to form the digital beam reforming, slicing, and multiplexing unit, as well as a digital beam refocusing unit.

Thus, the digital beam reforming, digital beam slicing, and digital beam multiplexing unit can significantly increase both spectral resolution and SNR of the optical spectrometer without the need for additional analog optical elements, and therefore does not increase optical setup complexity or costs, or associated issues. In an embodiment, the digital beam reforming, digital beam slicing, and digital beam multiplexing unit can be used in conjunction with an optical slicer to further increase spectral resolution and SNR beyond that provided by the optical slicer alone, as shown in one of the embodiments described below.

In another embodiment, a digital beam refocusing unit, operating at any focusing optical power, is used to negate the need for an optical focusing element. The digital beam refocusing unit is designed to receive a spectrally dispersed beam and refocus the beam to digitally create a plurality of beams with the desired focus.

As discussed in further detail below, various embodiments of an improved optical spectrometer incorporating a digital beam reforming, slicing, and multiplexing ("DBRSM") unit (and a digital beam refocusing unit in some embodiments) are illustrated. With the DBRSM unit, as well as a digital beam refocusing unit in some embodiments, the present system, method, and apparatus is able to measure and distinguish closely spaced spectral features such as transmission lines, absorption lines, and emission lines better than an optical spectrometer without the DBRSM unit, thereby allowing for a higher performance optical spectrometer with significantly increased spectral resolution and SNR. Furthermore, unlike many of the analog methods for increasing spectral resolution and SNR, the present invention does not decrease the light throughput of the optical spectrometer, thereby surmounting the conventional resolution-throughput trade-off.

In general terms, the present system, method, and apparatus in accordance with various embodiments may include one or more of the following:

1) an optical slicer: a) an image slicer before the entrance aperture; orb) a pupil slicer after the collimating element;
2) an entrance aperture (e.g., a slit, a pinhole, an optical fiber, etc.);
3) a collimating element (refractive or reflective);
4) a dispersive element (e.g., blazed or non-blazed single- or multi-axis ruled grating, concave grating, Echelle grating, blazed or non-blazed holographic grating, prism, grism, any photonics or integrated microspectrometers (e.g. arrayed waveguide gratings, tunable microresonators, or miniaturized microdonut resonators) etc.), 4) a focusing element (refractive or reflective);
5) a digital beam refocusing unit;
6) a detector (e.g., CCD, CMOS, InGaAs, etc.); and
7) a DBRSM unit (which can take on the form of a separate digital beam reforming unit, a digital beam slicing unit, and a digital beam multiplexing unit).

In an illustrative embodiment (see FIG. 1), light enters the system through the entrance aperture. The light beam passing through the entrance aperture then diverges until it encounters a collimating element to produce a collimated light beam. The collimated light beam then continues on and is then projected onto a dispersive element which splits the input light beam into its spectral components in the form of multiple collimated light beams traveling at different angles depending on the wavelength of light (which we will denote as 'spectral light beams'). The multiple output spectral light beams from the dispersive element are then focused, using a focusing element, and projected onto a detector. The spectral light beams projected onto the detector are digitally recorded and the digital recordings is used to produce digital spectral light beams. The digital spectral light beams are fed into a digital beam reformer, where the shape and size of the digital spectral light beams are altered to produce digitally reformed spectral light beams with the desired narrow beam configuration based on calibration beam profiles (which are either previously determined or learned dynamically) at different wavelengths. The output reformed digital spectral light beams are then fed into a digital beam slicer, where the beams are spatially sliced into digital beam portions, and spatially reformed and aligned so that spectral information corresponding to the same wavelength are aligned with each other. The set of output aligned digital spectral light beam portions are then fed into a digital beam multiplexer, where the digital beam portions are multiplexed together to form the final set of output digital spectral light beams at different wavelengths; a spectrum. The digital beam reformer, digital beam slicer, and digital beam multiplexer all operate at a resolution equal to or higher than the resolution of the detector (leading to sub-pixel resolution) for improving spectral resolution of the captured spectrum.

In another illustrative embodiment (see FIG. 2), light enters the system through the entrance aperture. The light beam passing through the aperture then diverges until it encounters a collimating element to produce a collimated light beam. The collimated light beam then continues on and is then projected onto a multi-axis dispersive element (e.g., double-axis diffraction grating) which splits the input light beam into multiple sets of spectral light beams. The multiple sets of output spectral light beams from the dispersive element are then focused, using a focusing element, and projected onto a detector. The multiple sets of spectral light beams projected onto the detector are digitally recorded and the digital recordings is used to produce multiple sets of digital spectral light beams. The multiple sets of digital spectral light beams are fed into a digital beam reformer, where the shape and size of the multiple sets of digital spectral light beams are altered to produce multiple sets of digitally reformed spectral light beams with the desired narrow beam configuration based on calibration beam profiles (which are either previously determined or learned dynamically) at different wavelengths. The multiple sets of output reformed digital spectral light beams are then fed into a digital beam slicer, where the multiple sets of digital spectral light beams are spatially sliced into multiple sets of digital beam portions, and spatially reformed and aligned so that spectral information across multiple sets of digital beam portions corresponding to the same wavelength are aligned with each other. The multiple sets of output aligned digital spectral light beam portions are then fed into a digital beam multiplexer, where the multiple sets of digital beam portions are multiplexed together to form the final set of output digital spectral light beams at different wavelengths; a spectrum. The digital beam reformer, digital beam slicer, and digital beam multiplexer all operate at a resolution equal to or higher than the resolution of the detector (leading to sub-pixel resolution) for improving spectral resolution of the captured spectrum.

Figure 3A:
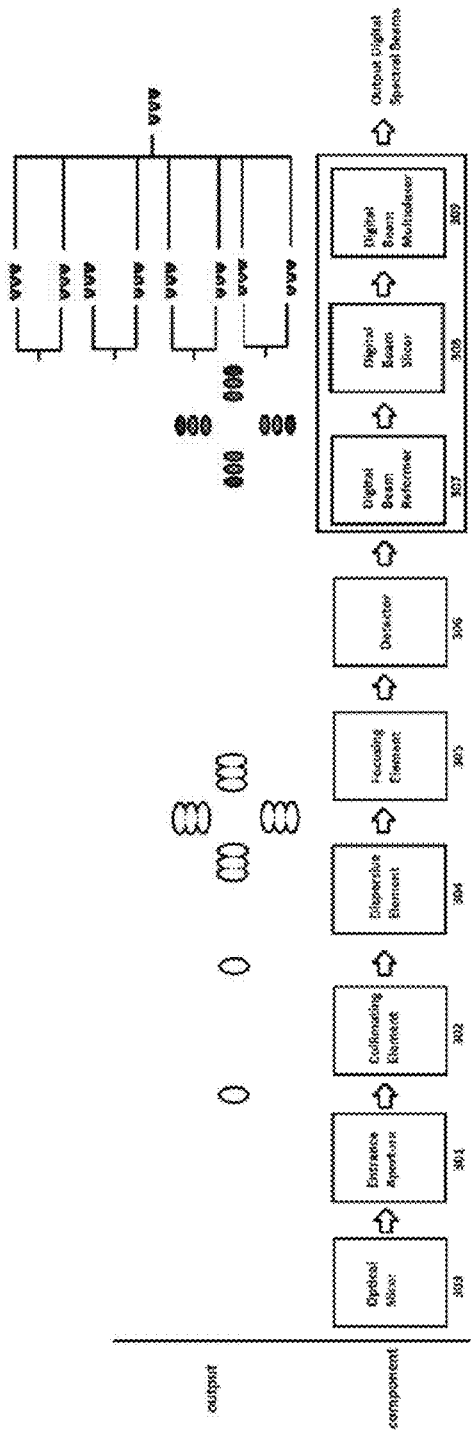
FIGS. 3(a) and 3(b) show yet another illustrative embodiment incorporating either an image or a pupil slicer with a single-axis or multi-axis dispersive element, digital beam reformer, digital beam slicer, and digital beam multiplexer.
Figure 3B:
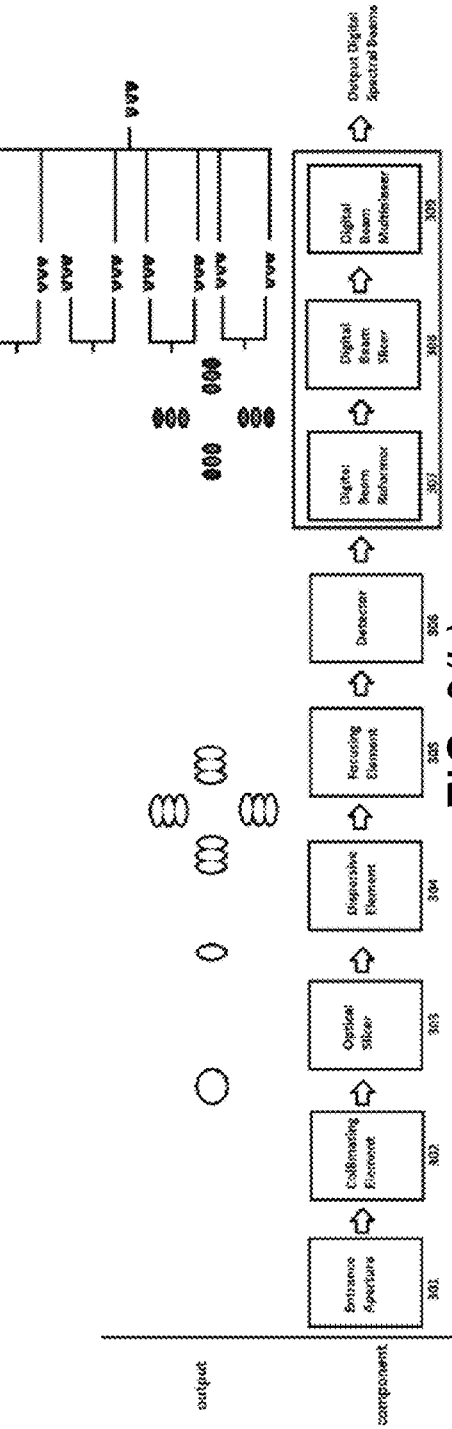

In yet another illustrative embodiment where optical slicers are used (see FIGS. 3(a) and 3(b)), light enters the system through the entrance aperture after it has been sliced by an optical image slicer (configuration 1). The light beam passing through the aperture then diverges until it encounters a collimating element to produce a collimated light beam. The collimated beam is the sliced by an optical pupil slicer (configuration 2) and is then projected onto either a single-axis dispersive element or a multi-axis dispersive element which splits the input light beam into one or more sets of spectral light beams. The one or more sets of output spectral light beams from the dispersive element are then focused, using a focusing element, and projected onto a detector. The one or more sets of spectral light beams projected onto the detector are digitally recorded and the digital recordings is used to produce one or more sets of digital spectral light beams. The one or more sets of digital spectral light beams are fed into a digital beam reformer, where the shape and size of the one or more sets of digital spectral light beams are altered to produce one or more sets of digitally reformed spectral light beams with the desired narrow beam configuration based on calibration beam profiles (which are either previously determined or learned dynamically) at different wavelengths. The one or more sets of output reformed digital spectral light beams are then fed into a digital beam slicer, where the one or more sets of digital spectral light beams are spatially sliced into one or more sets of digital beam portions, and spatially reformed and aligned so that spectral information across one or more sets of digital beam portions corresponding to the same wavelength are aligned with each other. The one or more sets of output aligned digital spectral light beam portions are then fed into a digital beam multiplexer, where the one or more sets of digital beam portions are multiplexed together to form the final set of output digital spectral light beams at different wavelengths; a spectrum. The digital beam reformer, digital beam slicer, and digital beam multiplexer all operate at a resolution equal to or higher than the resolution of the detector (leading to sub-pixel resolution) for improving spectral resolution of the captured spectrum.

Figure 4A:
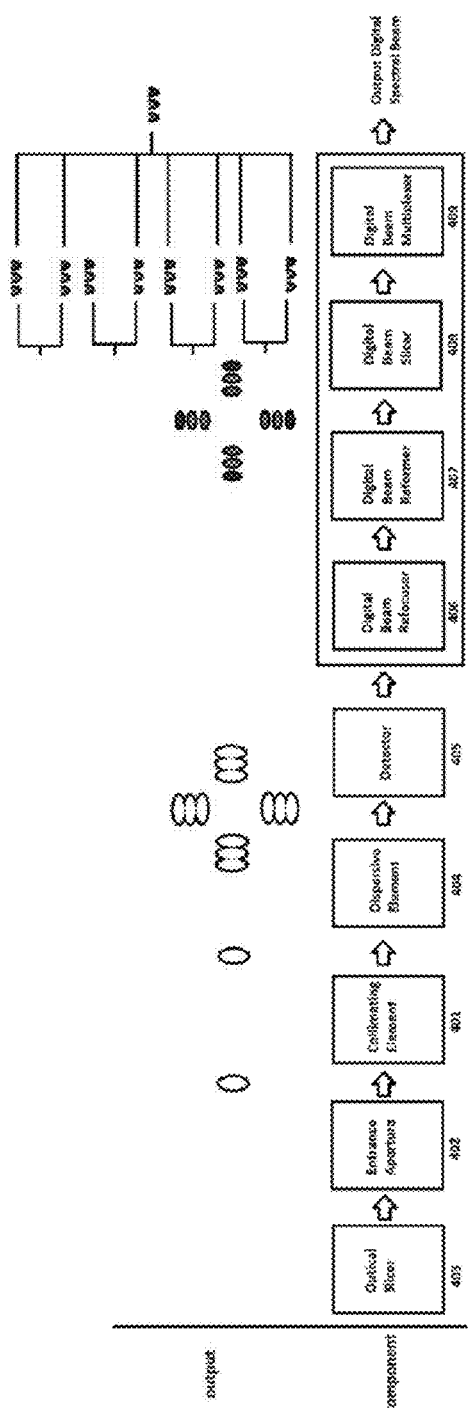
FIGS. 4(a) and 4(b) show yet another illustrative embodiment incorporating either an image or a pupil slicer (or without an image or pupil slicer) with a single-axis or multi-axis dispersive element, digital beam refocuser, digital beam reformer, digital beam slicer, and digital beam multiplexer.
Figure 4B:
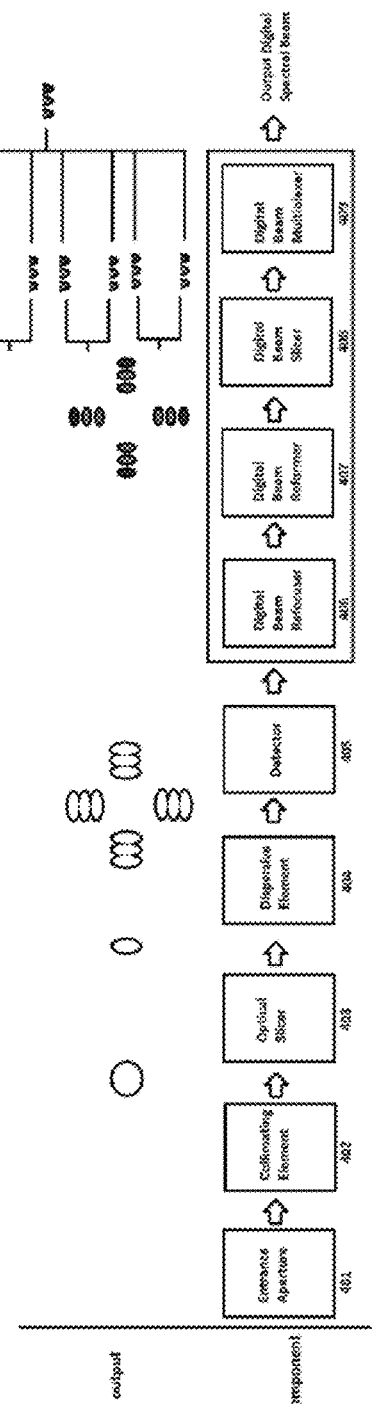

In yet another illustrative embodiment where a digital beam refocuser unit is used (see FIGS. 4(a) and 4(b)), light enters the system through the entrance aperture after it has been sliced by an optical image slicer (configuration 1). The light beam passing through the aperture then diverges until it encounters a collimating element to produce a collimated light beam. The collimated beam is the sliced by an optical pupil slicer (configuration 2) is then projected onto either a single-axis dispersive element or a multi-axis dispersive element which splits the input light beam into one or more sets of spectral light beams. Note that the optical image slicer and the optical pupil slicer may be omitted in alternative configurations of this embodiment. The one or more sets of output spectral light beams from the dispersive element are then projected onto a detector. The one or more sets of spectral light beams projected onto the detector are digitally recorded and the digital recordings is used to produce one or more sets of digital spectral light beams. The one or more sets of digital spectral light beams are fed into a digital beam refocuser, which focuses the digital spectral light beams, at any arbitrary focusing power surpassing the capabilities of any analog optical focusing element, to produce a one or more sets of focused digital spectral light beams. The one or more sets of focused digital spectral light beams are fed into a digital beam reformer, where the shape and size of the one or more sets of digital spectral light beams are altered to produce one or more sets of digitally reformed spectral light beams with the desired narrow beam configuration based on calibration beam profiles (which are either previously determined or learned dynamically) at different wavelengths. The one or more sets of output reformed digital spectral light beams are then fed into a digital beam slicer, where the one or more sets of digital spectral light beams are spatially sliced into one or more sets of digital beam portions, and spatially reformed and aligned so that spectral information across one or more sets of digital beam portions corresponding to the same wavelength are aligned with each other. The one or more sets of output aligned digital spectral light beam portions are then fed into a digital beam multiplexer, where the one or more sets of digital beam portions are multiplexed together to form the final set of output digital spectral light beams at different wavelengths; a spectrum. The digital beam refocuser, digital beam reformer, digital beam slicer, and digital beam multiplexer all operate at a resolution equal to or higher than the resolution of the detector (leading to sub-pixel resolution) for improving spectral resolution of the captured spectrum.

Various illustrative embodiments will now be described with reference to the drawings. It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

With reference to FIG. 1, the embodiment of the invention with a single-axis dispersive element, digital beam reformer, digital beam slicer, and digital beam multiplexer is illustrated. Light enters the system through the entrance aperture 101. The light beam passing through the aperture then diverges until it encounters a collimating element 102, to produce a collimated light beam. The collimated light beam then continues on and is then projected onto a dispersive element 103, which splits the input light beam into its spectral components in the form of multiple collimated light beams traveling at different angles depending on the wavelength of light (which we will denote as 'spectral light beams'). The multiple output spectral light beams from the dispersive element 103 are then focused, using a focusing element 104, and projected onto a detector 105. The spectral light beams projected onto the detector are digitally recorded and the digital recordings is used to produce digital spectral light beams. The digital spectral light beams are fed into a digital beam reformer 106, where the shape and size of the digital spectral light beams are altered to produce digitally reformed spectral light beams with the desired narrow beam configuration based on calibration beam profiles (which are either previously determined or learned dynamically) at different wavelengths. Given the digital spectral light beams S, the output reformed light beams R at a desired narrow band configuration can be obtained by maximizing a beam configuration quality metric Q that takes the S, a calibration beam profile function C (which varies as a function of wavelength), and noise scale factor H as part of the input parameters:

$$R = \mathrm{argmax}_R \; Q(R,S,C,H)$$

In an embodiment, the beam configuration quality metric Q is set as the conditional probability of R, given digital spectral light beams S, calibration beam profile function C, and noise scale factor H:

$$Q(R,S,C,H) = P(R|S,C,H)$$

where P denotes the conditional probability of R given S, C, and H (based on system characteristics), resulting in a Maximum a Posteriori (MAP) estimation of R. In another embodiment, the beam configuration quality metric Q is the negative L2 error norm with total variation regularizer:

$$Q(R,S,C,H) = -(\|C(R)-S\|_2 + \lambda H \|\nabla R\|_1)$$

where $\|\cdot\|_2$ denotes L2 error norm, $\nabla$ denotes gradient, and $\lambda$ is a scaling factor. In yet another embodiment, the quality metric Q is the negative L1 error norm with total variation regularizer:

$$Q(R,S,C,H) = -(\|C(R)-S\|_1 + \lambda H \|\nabla R\|_1)$$

where $\|\cdot\|_1$ denotes L1 error norm, $\nabla$ denotes gradient, and $\lambda$ is a scaling factor. It will be appreciated, however, that the implementation of the present system, method, and apparatus is not limited to these beam configuration quality metrics for Q, and other metrics may be used for Q in other embodiments. Also, it will be appreciated, however, that the implementation of the present system, method, and apparatus is not limited to the above digital beam reforming schemes, and other digital beam reforming schemes obtaining the output reformed light beams R, such as Minimum Least Squares estimation schemes, Wiener-Kolmogorov estimation schemes, and Maximum Likelihood estimation schemes as examples, may be used in other embodiments.

Figure 5:
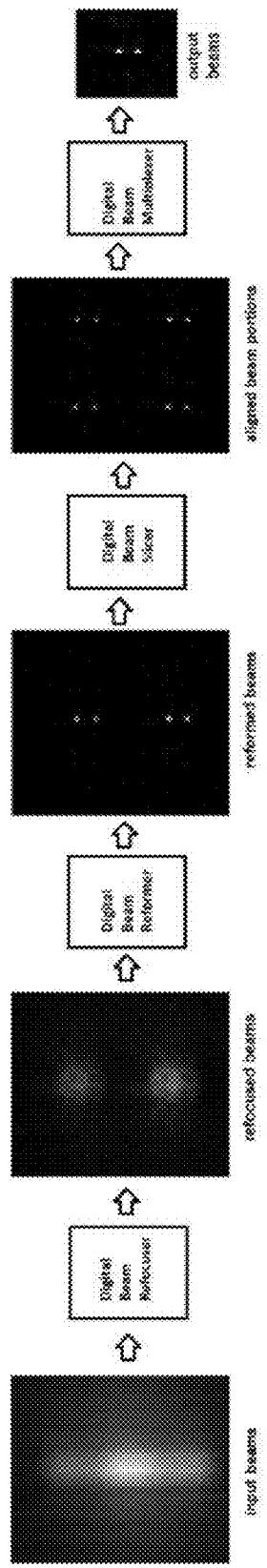
FIG. 5 shows the output digital spectral light beams produced by the digital beam refocuser, by the digital beam reformer, by the digital beam slicer, and by the digital beam multiplexer in accordance with an embodiment.
Figure 6:
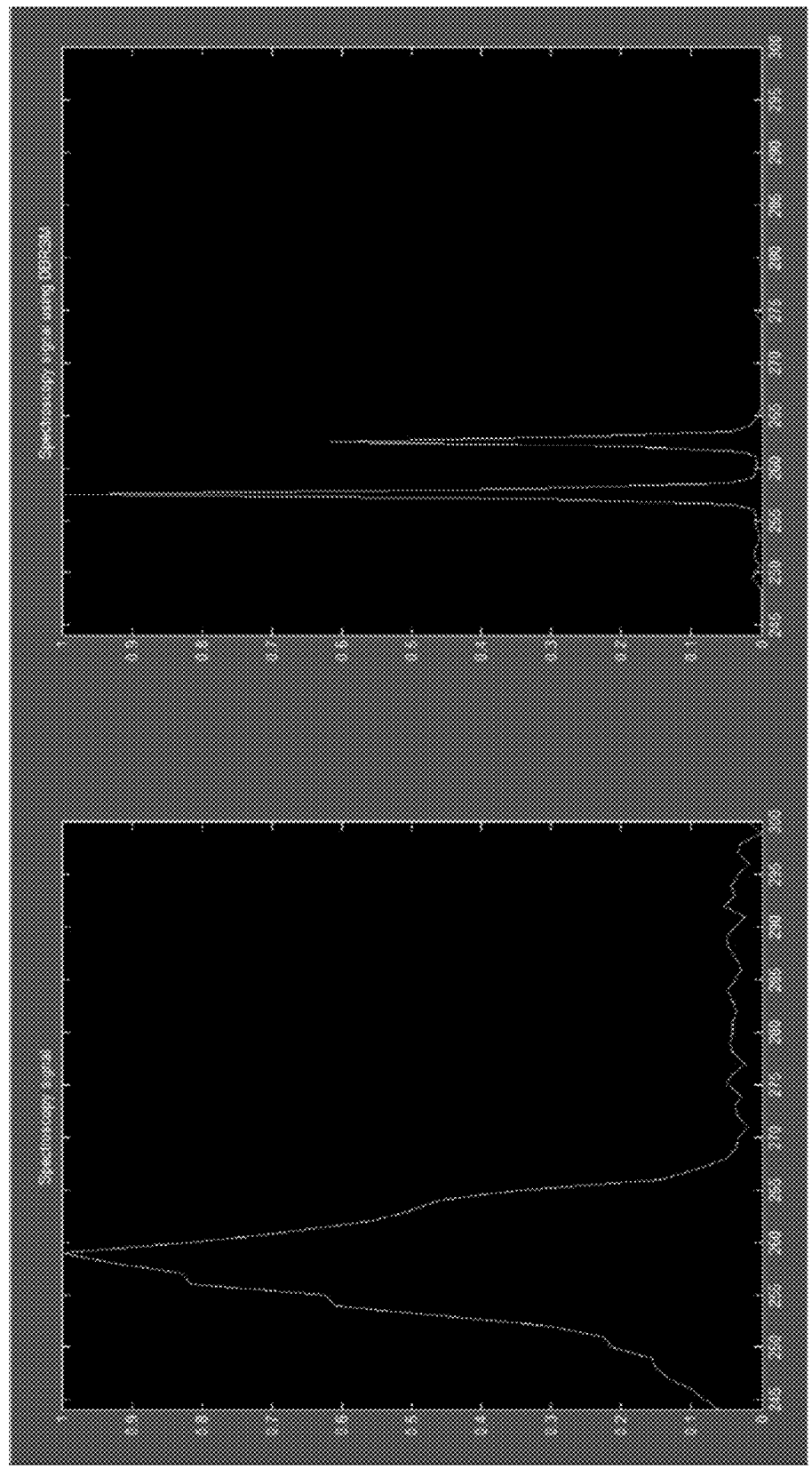
FIGS. 6(a) and 6(b) show a spectrum produced in accordance with the prior art, and a spectrum produced using the present system, method and apparatus in accordance with an embodiment.

The output reformed digital spectral light beams, R, are then fed into a digital beam slicer 107, where the beams are spatially sliced into digital beam portions, and spatially reformed and aligned so that spectral information corresponding to the same wavelength are aligned with each other. The set of output aligned digital spectral light beam portions are then fed into a digital beam multiplexer 108, where the digital beam portions are multiplexed together to form the final set of output digital spectral light beams at different wavelengths; a spectrum. In an embodiment, the set of n aligned digital spectral light beam portions $A_1$, $A_2, \ldots, A_n$ are multiplexed, using the digital beam multiplexer, as a weighted summation of the light beam portions on a per-wavelength basis to form the final output final set of output digital spectral light beams denoted by F:

$$F = w_1 A_1 + w_2 A_2 + \ldots + w_n A_n$$

where $w_i$ is the weight for the ith aligned digital spectral light beam portion. It will be appreciated, however, that the implementation of the present system, method, and apparatus is not limited to this multiplexing scheme, and other multiplexing schemes, such as weighted multiplication schemes as an example, may be used in other embodiments. The digital beam reformer, digital beam slicer, and digital beam multiplexer all operate at a resolution equal to or higher than the resolution of the detector (leading to sub-pixel resolution) for improving spectral resolution of the captured spectrum. FIG. 5 shows the output digital spectral light beams produced by the digital beam reformer, by the digital beam slicer, and by the digital beam multiplexer. It can be seen that the close-by spectral features (in this case two close-by spectral peaks) can be much better distinguished after using the digital beam reformer, digital beam slicer, and digital beam multiplexer in the present invention. FIG. 6 shows a spectrum produced without using the invention, and a spectrum produced using the invention. It can be seen that not only are the close-by spectral features (in this case two close-by spectral peaks) in the spectrum much better distinguished after using the digital beam reformer, digital beam slicer, and digital beam multiplexer in the present invention, but also there is a significant reduction in SNR in the spectrum produced using the digital beam reformer, digital beam slicer, and digital beam multiplexer in the present invention.

Figure 2:
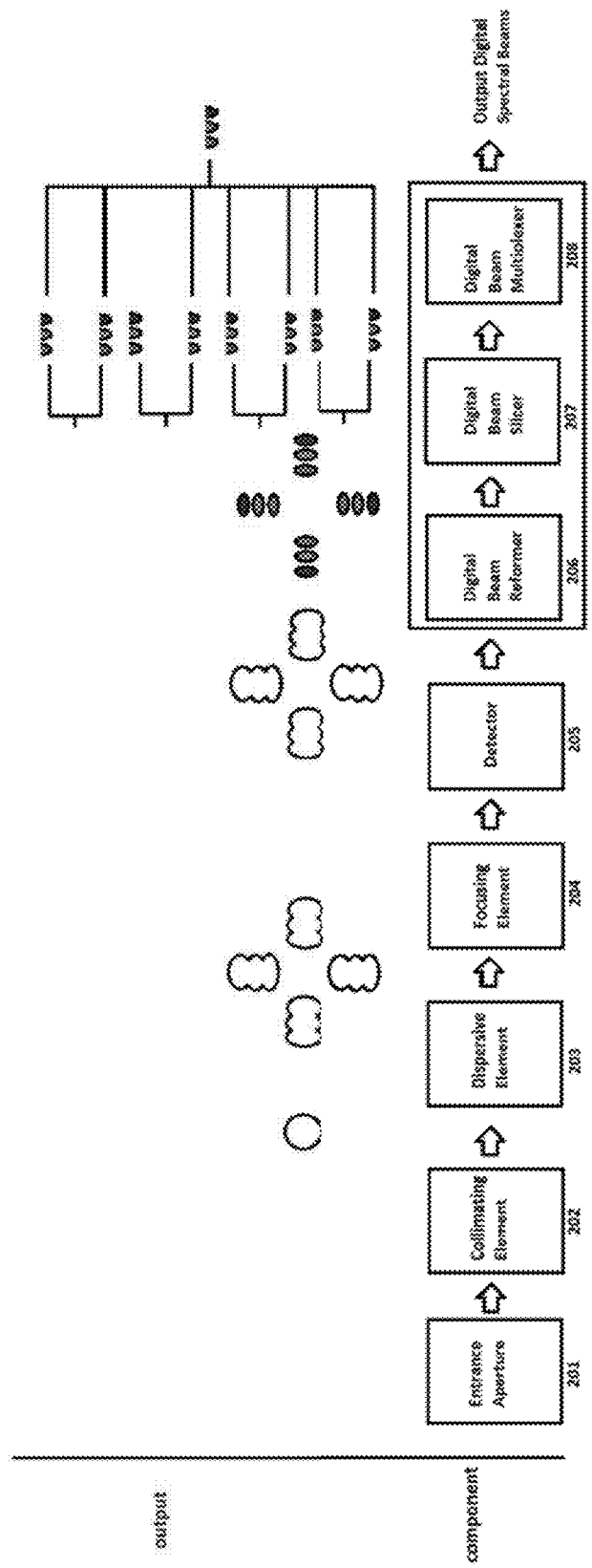
FIG. 2 shows another illustrative embodiment with a multi-axis dispersive element, digital beam reformer, digital beam slicer, and digital beam multiplexer.

With reference to FIG. 2, the embodiment of the invention with a multi-axis dispersive element, digital beam reformer, digital beam slicer, and digital beam multiplexer is illustrated. Light enters the system through the entrance aperture 201. The light beam passing through the aperture then diverges until it encounters a collimating element 202 to produce a collimated light beam. The collimated light beam then continues on and is then projected onto a multi-axis dispersive element 203, such as a double-axis diffracting grating, which splits the input light beam into multiple sets of spectral light beams. The multiple sets of output spectral light beams from the dispersive element are then focused, using a focusing element 204, and projected onto a detector 205. The multiple sets of spectral light beams projected onto the detector are digitally recorded and the digital recordings is used to produce multiple sets of digital spectral light beams. The multiple sets of digital spectral light beams are fed into a digital beam reformer 206, where the shape and size of the multiple sets of digital spectral light beams are altered to produce multiple sets of digitally reformed spectral light beams with the desired narrow beam configuration based on calibration beam profiles (which are either previously determined or learned dynamically) at different wavelengths (with the method as described in the first embodiment of the invention described). The multiple sets of output reformed digital spectral light beams are then fed into a digital beam slicer 207, where the multiple sets of digital spectral light beams are spatially sliced into multiple sets of digital beam portions, and spatially reformed and aligned so that spectral information across multiple sets of digital beam portions corresponding to the same wavelength are aligned with each other. The multiple sets of output aligned digital spectral light beam portions are then fed into a digital beam multiplexer 208, where the multiple sets of digital beam portions are multiplexed together (with the method as described in the first embodiment of the invention described) to form the final set of output digital spectral light beams at different wavelengths; a spectrum. The digital beam reformer, digital beam slicer, and digital beam multiplexer all operate at a resolution equal to or higher than the resolution of the detector (leading to sub-pixel resolution) for improving spectral resolution of the captured spectrum.

With reference to FIGS. 3(a) and 3(b), the embodiment of the invention with an optical slicer, single-axis or multi-axis dispersive element, digital beam reformer, digital beam slicer, and digital beam multiplexer is illustrated. Note, in this embodiment the optical slicer, 303, will be placed before the entrance pupil of the spectrometer, an optical image slicer, or after the collimating element, an optical pupil slicer. Light enters the system through the entrance aperture 301. The light beam passing through the aperture then diverges until it encounters a collimating element 302 to produce a collimated light beam. The light beam then encounters an optical slicer 303 to produce a reformatted light beam. The collimated light beam then continues on and is then projected onto a single-axis or multi-axis dispersive element 304, which splits the input light beam into multiple sets of spectral light beams. The multiple sets of output spectral light beams from the dispersive element are then focused, using a focusing element 305, and projected onto a detector 306. The multiple sets of spectral light beams projected onto the detector are digitally recorded and the digital recordings is used to produce multiple sets of digital spectral light beams. The multiple sets of digital spectral light beams are fed into a digital beam reformer 307, where the shape and size of the multiple sets of digital spectral light beams are altered to produce multiple sets of digitally reformed spectral light beams with the desired narrow beam configuration based on calibration beam profiles (which are either previously determined or learned dynamically) at different wavelengths (with the method as described in the first embodiment of the invention described). The multiple sets of output reformed digital spectral light beams are then fed into a digital beam slicer 308, where the multiple sets of digital spectral light beams are spatially sliced into multiple sets of digital beam portions, and spatially reformed and aligned so that spectral information across multiple sets of digital beam portions corresponding to the same wavelength are aligned with each other. The multiple sets of output aligned digital spectral light beam portions are then fed into a digital beam multiplexer 309, where the multiple sets of digital beam portions are multiplexed together (with the method as described in the first embodiment of the invention described) to form the final set of output digital spectral light beams at different wavelengths; a spectrum. The digital beam reformer, digital beam slicer, and digital beam multiplexer all operate at a resolution equal to or higher than the resolution of the detector (leading to sub-pixel resolution) for improving spectral resolution of the captured spectrum.

With reference to FIGS. 4(a) and 4(b), the embodiment of the invention with (or without) an optical slicer, single-axis or multi-axis dispersive element, digital beam refocuser, digital beam reformer, digital beam slicer, and digital beam multiplexer is illustrated. Note, in this embodiment the optical slicer, 403, will be placed before the entrance pupil of the spectrometer, an optical image slicer, or after the collimating element, an optical pupil slicer. Light enters the system through the entrance aperture 401. The light beam passing through the aperture then diverges until it encounters a collimating element 402 to produce a collimated light beam. The light beam then encounters an optical slicer 403 to produce a reformatted light beam. Note that the optical slicer 403 (either as an optical image slicer or as an optical pupil slicer) may be omitted in an alternate configuration of this embodiment. The collimated light beam then continues on and is then projected onto a single-axis or multi-axis dispersive element 404, which splits the input light beam into multiple sets of spectral light beams. The multiple sets of output spectral light beams from the dispersive element are then projected onto a detector 405. The multiple sets of spectral light beams projected onto the detector are digitally recorded and the digital recordings is used to produce multiple sets of digital spectral light beams. The multiple sets of digital spectral light beams are fed into a digital beam refocuser 406, which focuses the digital spectral light beams based on calibration beam defocus profiles (which are either previously determined or learned dynamically). Note that the power of the digital beam refocuser can be selected to be any arbitrary focusing power (f/# or numerical aperture) surpassing the capabilities of any analog optical focusing element. Given the digital spectral light beams S, the output refocused light beams G at a desired focus can be obtained by maximizing a beam focus quality metric E that takes the S, a calibration beam defocus profile function D, and noise scale factor B as part of the input parameters:

$$G = \mathrm{argmax}_G E(G,S,D,B)$$

In an embodiment, the beam configuration quality metric E is set as the conditional probability of G, given digital spectral light beams S, calibration beam defocus profile function D, and noise scale factor B:

$$E(G,S,D,B) = P(G|S,D,B)$$

where P denotes the conditional probability of G given S, D, and B (based on system characteristics), resulting in a Maximum a Posteriori (MAP) estimation of G. It will be appreciated, however, that the implementation of the present system, method, and apparatus is not limited to this refocusing scheme, and other refocusing schemes for obtaining the output refocused light beams G, such as Minimum Least Squares estimation schemes, Wiener-Kolmogorov estimation schemes, and Maximum Likelihood estimation schemes as examples, may be used in other embodiments. The multiple sets of output focused digital spectral light beams are fed into a digital beam reformer 407, where the shape and size of the multiple sets of digital spectral light beams are altered to produce multiple sets of digitally reformed spectral light beams with the desired narrow beam configuration based on calibration beam profiles (which are either previously determined or learned dynamically) at different wavelengths (with the method as described in the first embodiment of the invention described). The multiple sets of output reformed digital spectral light beams are then fed into a digital beam slicer 408, where the multiple sets of digital spectral light beams are spatially sliced into multiple sets of digital beam portions, and spatially reformed and aligned so that spectral information across multiple sets of digital beam portions corresponding to the same wavelength are aligned with each other. The multiple sets of output aligned digital spectral light beam portions are then fed into a digital beam multiplexer 409, where the multiple sets of digital beam portions are multiplexed together (with the method as described in the first embodiment of the invention described) to form the final set of output digital spectral light beams at different wavelengths; a spectrum. The digital beam refocuser, digital beam reformer, digital beam slicer, and digital beam multiplexer all operate at a resolution equal to or higher than the resolution of the detector (leading to sub-pixel resolution) for improving spectral resolution of the captured spectrum.

FIG. 5 shows the output digital spectral light beams produced by the digital beam refocuser, by the digital beam reformer, by the digital beam slicer, and by the digital beam multiplexer. It can be observed that the digital beam refocuser can take a spectrally dispersed beam and refocus the beam to digital create a plurality of beams with the desired focus.

FIGS. 6(a) and 6(b) show a spectrum produced in accordance with the prior art, and a spectrum produced using the present system, method and apparatus in accordance with an embodiment. Whereas the spectroscopy signal in FIG. 6(a) shows a single peak, the spectroscopy signal in FIG. 6(b) shows two distinct peaks that have been resolved which were previously seen as a single peak. The proposed invention is thus able to extract high-resolution spectral information (i.e. spectral emission or absorption lines) from the acquired low-resolution spectrum that are otherwise hidden and not noticeable.

Figure 7:
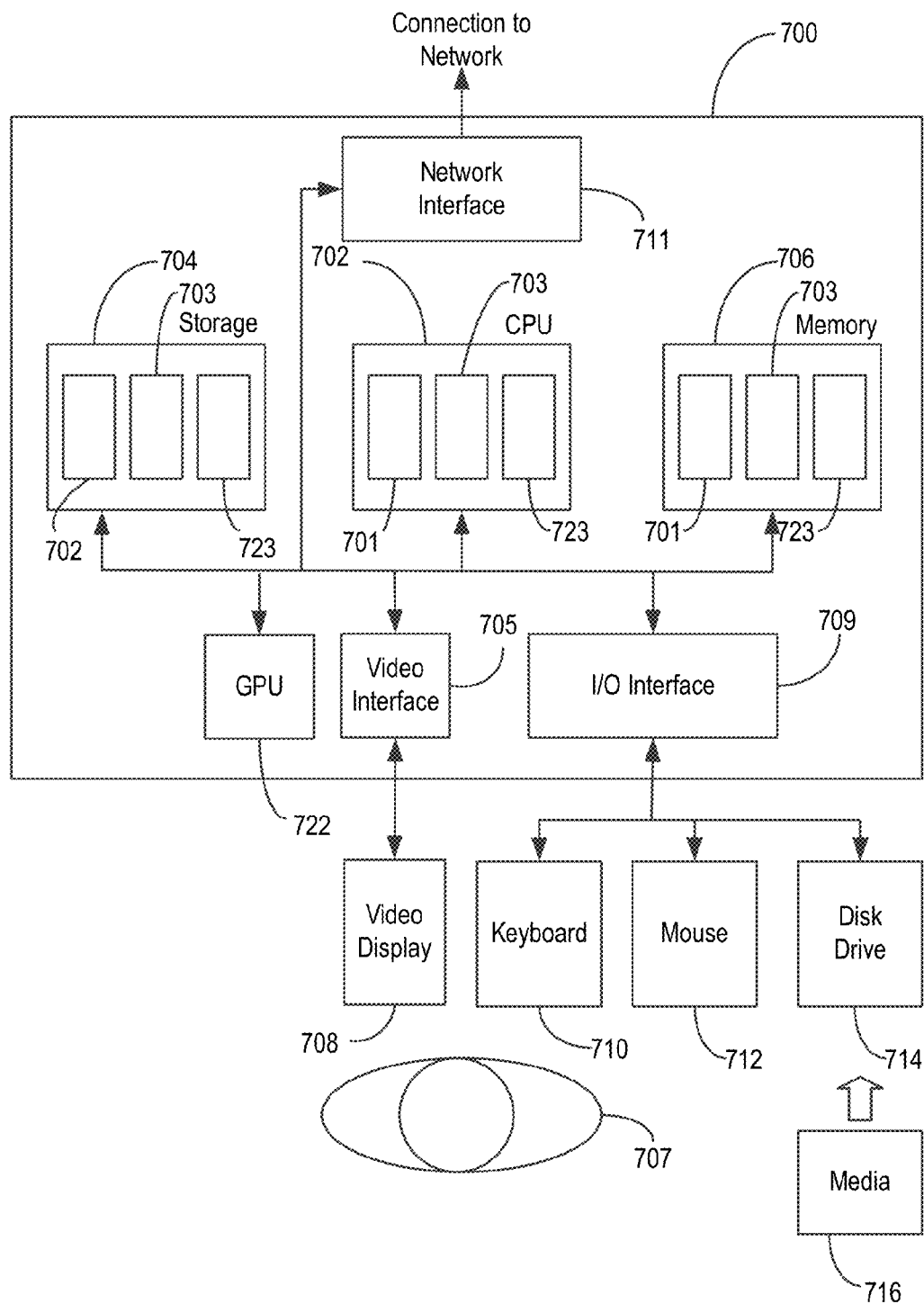
FIG. 7 shows a schematic block diagram of a generic computing device which may provide an operating environment for various embodiments In the drawings, embodiments are illustrated by way of example. It is to be expressly understood that the description and drawings are only for the purpose of illustration and as an aid to understanding, and are not intended as describing

Now referring to FIG. 7 shown is a schematic block diagram of a generic computing device that may provide a suitable operating environment in one or more embodiments. A suitably configured computer device, and associated communications networks, devices, software and firmware may provide a platform for enabling one or more embodiments as described above. By way of example, FIG. 7 shows a generic computer device 700 that may include a central processing unit ("CPU") 702 connected to a storage unit 704 and to a random access memory 706. The CPU 702 may process an operating system 701, application program 703, and data 723. The operating system 701, application program 703, and data 723 may be stored in storage unit 704 and loaded into memory 706, as may be required. Computer device 700 may further include a graphics processing unit (GPU) 722 which is operatively connected to CPU 702 and to memory 706 to offload intensive image processing calculations from CPU 702 and run these calculations in parallel with CPU 702. An operator 710 may interact with the computer device 700 using a video display 708 connected by a video interface 705, and various input/output devices such as a keyboard 710, pointer 712, and storage 714 connected by an I/O interface 709. In known manner, the pointer 712 may be configured to control movement of a cursor or pointer icon in the video display 708, and to operate various graphical user interface (GUI) controls appearing in the video display 708. The computer device 700 may form part of a network via a network interface 711, allowing the computer device 700 to communicate with other suitably configured data processing systems or circuits. One or more different types of sensors 730 connected via a sensor interface 732 may be used to search for and sense input from various sources. The sensors 730 may be built directly into the generic computer device 700, or optionally configured as an attachment or accessory to the generic computer device 700.

Thus, in an aspect, there is provided a system for improving spectral resolution and signal-to-noise ratio of an optical spectrometer, comprising: a digital beam reformer adapted to receive a spectrally dispersed beam and reform the beam spatially to create a digital beam having a plurality of digital beam portions with at least one spatial dimension smaller than the received beam; a digital beam slicer adapted to split the reformed beam and digitally split and align the plurality of digital beam portions such that their spectral information is aligned with one another; and a digital beam multiplexer adapted to combine the plurality of digital beam portions to form a final spectrum at higher spectral resolution and increased signal-to-noise ratio.

In an embodiment, the digital beam reformer is further adapted to reform the beam spatially by altering the shape and size of the received spectrally dispersed beam to produce digitally reformed spectral light beams with a desired narrow beam configuration based on calibration beam profiles, either previously determined or learned dynamically.

In another embodiment, given a digital spectral light beams S, the digital beam reformer is adapted to output reformed light beams R at a desired narrow band configuration by maximizing a beam configuration quality metric Q that takes the digital spectral light beams S, a calibration beam profile function C which varies as a function of wavelength, and noise scale factor H as part of the input parameters:

$$R = \mathrm{argmax}_R\, Q(R|S,C,H).$$

In another embodiment, the beam configuration quality metric Q is set as the conditional probability of R, given digital spectral light beams S, calibration beam profile function C, and noise scale factor H: $Q(R,S,C,H)=P(R|S,C,H)$, where P denotes the conditional probability of R given S, C, and H (based on system characteristics), resulting in a Maximum a Posteriori (MAP) estimation of R.

In another embodiment, the beam configuration quality metric Q is a negative L2 error norm with a total variation regularizer: $Q(R,S,C,H)=-(\|C(R)-S\|_2+\lambda H\|\nabla R\|_1)$, where $\|\cdot\|_2$ denotes L2 error norm, $\nabla$ denotes gradient, and $\lambda$ is a scaling factor.

In another embodiment, the beam configuration quality metric Q is a negative L1 error norm with total variation regularizer: $Q(R,S,C,H)=-(\|C(R)-S\|_1+\lambda H\|\nabla R\|_1)$, where $\|\cdot\|_1$ denotes L1 error norm, $\nabla$ denotes gradient, and $\lambda$ is a scaling factor.

In another embodiment, the output reformed light beams R are obtained with a reforming scheme utilizing Minimum Least Squares estimation, Wiener-Kolmogorov estimation, or Maximum Likelihood estimation.

In another embodiment, the digital beam slicer is further adapted to spatially slice multiple sets of digital spectral light beams into multiple sets of digital beam portions, and spatially reform and align the multiple sets of digital beam portions so that spectral information across the aligned multiple sets of digital beam portions correspond to the same wavelength.

In another embodiment, the digital beam multiplexer is further adapted to multiplex the multiple sets of digital beam portions to form a final set of output digital spectral light beams at different wavelengths, thereby forming a spectrum.

In another embodiment, the digital beam multiplexer is further adapted to multiplex a set of n aligned digital beam portions $A_1, A_2, \ldots, A_n$ by calculating a weighted summation of the light beam portions on a per-wavelength basis to for the final set F of output digital light beams: $F=w_1 A_1 + w_2 A_2 + \ldots + w_n A_n$, wherein $w_i$ is the weight for the ith aligned digital spectral light beam portion.

In another embodiment, the system further comprises a digital beam refocuser adapted to receive the spectrally dispersed beam and refocus the beam to create a plurality of digital beam portions with a desired focus utilizing any focusing optical power, thereby negating the need for an optical focusing element.

In another aspect, there is disclosed a method of improving spectral resolution and signal-to-noise ratio of an optical spectrometer, comprising: receiving a spectrally dispersed beam utilizing a digital beam reformer, and reforming the beam spatially to create a digital beam having a plurality of digital beam portions with at least one spatial dimension smaller than the received beam; splitting the reformed beam utilizing a digital beam slicer to digitally split and align the plurality of digital beam portions such that their spectral information is aligned with one another; and combining the plurality of digital beam portions utilizing a digital beam multiplexer to form a final spectrum at higher spectral resolution and increased signal-to-noise ratio.

In an embodiment, the method further comprises receiving the spectrally dispersed beam and refocussing the beam utilizing a digital beam refocuser to digital create a plurality of digital beam portions with a desired focus utilizing any focusing optical power, thereby negating the need for an optical focusing element.

In an embodiment, given a digital spectral light beams S, the digital beam reformer is adapted to perform the step of outputting reformed light beams R at a desired narrow band configuration by maximizing a beam configuration quality metric Q that takes the digital spectral light beams S, a calibration beam profile function C which varies as a function of wavelength, and noise scale factor H as part of the input parameters:

$$R = \text{argmax}_R \; Q(R,S,C,H).$$

In an embodiment, the beam configuration quality metric Q is set as the conditional probability of R, given digital spectral light beams S, calibration beam profile function C, and noise scale factor H: $Q(R,S,C,H)=P(R|S,C,H)$, where P denotes the conditional probability of R given S, C, and H (based on system characteristics), resulting in a Maximum a Posteriori (MAP) estimation of R.

In an embodiment, the beam configuration quality metric Q is a negative L2 error norm with a total variation regularizer: $Q(R,S,C,H)=-(\|C(R)-S\|_2+\lambda H\|\nabla R\|_1)$, where $\|\cdot\|_2$ denotes L2 error norm, $\nabla$ denotes gradient, and $\lambda$ is a scaling factor.

In an embodiment, the beam configuration quality metric Q is a negative L1 error norm with total variation regularizer: $Q(R,S,C,H)=-(\|C(R)-S\|_1+\lambda H\|\nabla R\|_1)$, where $\|\cdot\|_1$ denotes L1 error norm, $\nabla$ denotes gradient, and $\lambda$ is a scaling factor.

In an embodiment, the output reformed light beams R are obtained with a reforming scheme utilizing Minimum Least Squares estimation, Wiener-Kolmogorov estimation, or Maximum Likelihood estimation.

In an embodiment, the digital beam slicer is further adapted to spatially slice multiple sets of digital spectral light beams into multiple sets of digital beam portions, and spatially reform and align the multiple sets of digital beam portions so that spectral information across the aligned multiple sets of digital beam portions correspond to the same wavelength.

In an embodiment, the digital beam multiplexer is further adapted to multiplex the multiple sets of digital beam portions to form a final set of output digital spectral light beams at different wavelengths, thereby forming a spectrum.

In an embodiment, the digital beam multiplexer is further adapted to multiplex a set of n aligned digital beam portions $A_1, A_2, \ldots, A_n$ by calculating a weighted summation of the light beam portions on a per-wavelength basis to for the final set F of output digital light beams: $F=w_1A_1+w_2A_2+ \ldots +w_nA_n$, wherein $w_i$ is the weight for the ith aligned digital spectral light beam portion.

In another embodiment, the method further comprises providing a digital beam refocuser adapted to receive the spectrally dispersed beam and refocus the beam to create a plurality of digital beam portions with a desired focus utilizing any focusing optical power, thereby negating the need for an optical focusing element.

While illustrative embodiments have been described above by way of example, it will be appreciated that various changes and modifications may be made without departing from the scope of the invention, which is defined by the following claims.

REFERENCES

[1] I. S. Bowen, The Image-Slicer, A Device for Reducing Loss of Light at Slit of Stellar Spectrograph, The Astrophysical Journal, vol. 88, September 1938, No. 2.
[2] A. Poglitsch et al. The Photodetector Array Camera and Spectrometer (PACS) on the Space Observatory. Astronomy and Astrophysics 518: 12, 2010.
[3] L. Gao et al. "Compact Image Slicing Spectrometer (ISS) for hyperspectral fluorescence microscopy", Opt Express Jul. 20, 2009; 17(15): 12293-12308.
[4] O. Cardona et al., Star Image Shape Transformer for Astronomical Slit Spectroscopy, Revista Mexicana de Astronimia y Astrofisica, 46, 431-438 (2010).
[5] J. T. Meade et al. Optical slicer for improving the spectral resolution of a dispersive spectrograph, U.S. Pat. No. 8,958,065, 2015.

The invention claimed is:

1. A system for improving spectral resolution and signal-to-noise ratio of an optical spectrometer, comprising:
   a digital beam reformer adapted to receive a spectrally dispersed beam and digitally reform the beam spatially to create a digital beam having a plurality of digital beam portions with at least one spatial dimension smaller than the received beam;
   a digital beam slicer adapted to split the digitally reformed beam and digitally split and align the plurality of digital beam portions such that their spectral information is aligned with one another; and
   a digital beam multiplexer adapted to combine the plurality of digital beam portions to form a final spectrum at higher spectral resolution and increased signal-to-noise ratio.

2. The system of claim 1, wherein the digital beam reformer is further adapted to reform the beam spatially by altering the shape and size of the received spectrally dispersed beam to produce digitally reformed spectral light beams with a desired narrow beam configuration based on calibration beam profiles, either previously determined or learned dynamically.

3. The system of claim 1, wherein, given a digital spectral light beams S, the digital beam reformer is adapted to output reformed light beams R at a desired narrow band configuration by maximizing a beam configuration quality metric Q that takes the digital spectral light beams S, a calibration beam profile function C which varies as a function of wavelength, and noise scale factor H as part of the input parameters:

$$R=\text{argmax}R \; Q(R,S,C,H).$$

4. The system of claim 3, wherein the beam configuration quality metric Q is set as the conditional probability of R, given digital spectral light beams S, calibration beam profile function C, and noise scale factor H:

$$Q(R,S,C,H)=P(R|S,C,H)$$

where P denotes the conditional probability of R given S, C, and H (based on system characteristics), resulting in a Maximum a Posteriori (MAP) estimation of R.

5. The system of claim 4, wherein the beam configuration quality metric Q is a negative L2 error norm with a total variation regularizer:

$$Q(R,S,C,H)=-(\|C(R)-S\|2+\lambda H\|\nabla R\|1)$$

where $\|\cdot\|2$ denotes L2 error norm, $\nabla$ denotes gradient, and $\lambda$ is a scaling factor.

6. The system of claim 4, wherein the beam configuration quality metric Q is a negative L1 error norm with total variation regularizer:

$$Q(R,S,C,H)=-(\|C(R)-S\|1+\lambda H\|\nabla R\|1)$$

where $\|\cdot\|1$ denotes L1 error norm, $\nabla$ denotes gradient, and $\lambda$ is a scaling factor.

7. The system of claim 1, wherein the output reformed light beams R are obtained with a reforming scheme utilizing Minimum Least Squares estimation, Wiener-Kolmogorov estimation, or Maximum Likelihood estimation.

8. The system of claim 1, wherein the digital beam slicer is further adapted to spatially slice multiple sets of digital spectral light beams into multiple sets of digital beam portions, and spatially reform and align the multiple sets of digital beam portions so that spectral information across the aligned multiple sets of digital beam portions correspond to the same wavelength.

9. The system of claim 1, wherein the digital beam multiplexer is further adapted to multiplex the multiple sets of digital beam portions to form a final set of output digital spectral light beams at different wavelengths, thereby forming a spectrum.

10. The system of claim 9, wherein the digital beam multiplexer is further adapted to multiplex a set of n aligned digital beam portions A1, A2, . . . , An by calculating a weighted summation of the light beam portions on a per-wavelength basis to for the final set F of output digital light beams:

$$F=w1A1+w2A2+ \ldots +wnAn$$

wherein wi is the weight for the ith aligned digital spectral light beam portion.

11. The system of claim 1, further comprising a digital beam refocuser adapted to receive the spectrally dispersed beam and refocus the beam to create a plurality of digital beam portions with a desired focus utilizing any focusing optical power, thereby negating the need for an optical focusing element.

12. A method of improving spectral resolution and signal-to-noise ratio of an optical spectrometer, comprising:
receiving a spectrally dispersed beam utilizing a digital beam reformer, and digitally reforming the beam spatially to create a digital beam having a plurality of digital beam portions with at least one spatial dimension smaller than the received beam;
splitting the digitally reformed beam utilizing a digital beam slicer to digitally split and align the plurality of digital beam portions such that their spectral information is aligned with one another; and
combining the plurality of digital beam portions utilizing a digital beam multiplexer to form a final spectrum at higher spectral resolution and increased signal-to-noise ratio.

13. The method of claim 12, further comprising receiving the spectrally dispersed beam and refocussing the beam utilizing a digital beam refocuser to digital create a plurality of digital beam portions with a desired focus utilizing any focusing optical power, thereby negating the need for an optical focusing element.

14. The method of claim 12, wherein, given a digital spectral light beams S, the digital beam reformer is adapted to perform the step of outputting reformed light beams R at a desired narrow band configuration by maximizing a beam configuration quality metric Q that takes the digital spectral light beams S, a calibration beam profile function C which varies as a function of wavelength, and noise scale factor H as part of the input parameters:

$$R=\text{argmax}R \; Q(R,S,C,H).$$

15. The method of claim 14, wherein the beam configuration quality metric Q is set as the conditional probability of R, given digital spectral light beams S, calibration beam profile function C, and noise scale factor H:

$$Q(R,S,C,H)=P(R|S,C,H)$$

where P denotes the conditional probability of R given S, C, and H (based on system characteristics), resulting in a Maximum a Posteriori (MAP) estimation of R.

16. The method of claim 15, wherein the beam configuration quality metric Q is a negative L2 error norm with a total variation regularizer:

$$Q(R,S,C,H)=-(\|C(R)-S\|2+\lambda H\|\nabla R\|1)$$

where $\|\cdot\|2$ denotes L2 error norm, $\nabla$ denotes gradient, and $\lambda$ is a scaling factor.

17. The method of claim 15, wherein the beam configuration quality metric Q is a negative L1 error norm with total variation regularizer:

$$Q(R,S,C,H)=-(\|C(R)-S\|1+\lambda H\|\nabla R\|1)$$

where $\|\cdot\|1$ denotes L1 error norm, $\nabla$ denotes gradient, and $\lambda$ is a scaling factor.

18. The method of claim 12, wherein the output reformed light beams R are obtained with a reforming scheme utilizing Minimum Least Squares estimation, Wiener-Kolmogorov estimation, or Maximum Likelihood estimation.

19. The method of claim 12, wherein the digital beam slicer is further adapted to spatially slice multiple sets of digital spectral light beams into multiple sets of digital beam portions, and spatially reform and align the multiple sets of digital beam portions so that spectral information across the aligned multiple sets of digital beam portions correspond to the same wavelength.

20. The method of claim 12, wherein the digital beam multiplexer is further adapted to multiplex the multiple sets of digital beam portions to form a final set of output digital spectral light beams at different wavelengths, thereby forming a spectrum.

21. The method of claim 20, wherein the digital beam multiplexer is further adapted to multiplex a set of n aligned digital beam portions A1, A2, . . . , An by calculating a weighted summation of the light beam portions on a per-wavelength basis to for the final set F of output digital light beams:

$$F=w1A1+w2A2+ \ldots +wnAn$$

wherein wi is the weight for the ith aligned digital spectral light beam portion.

22. The method of claim 12, further comprising providing a digital beam refocuser adapted to receive the spectrally dispersed beam and refocus the beam to create a plurality of digital beam portions with a desired focus utilizing any focusing optical power, thereby negating the need for an optical focusing element.

* * * * *